United States Patent
Nachef et al.

(10) Patent No.: US 9,921,810 B2
(45) Date of Patent: *Mar. 20, 2018

(54) DYNAMIC CREATION OF OBJECT CLASSES

(71) Applicant: BULL SAS, Les Clayes Sous Bois (FR)

(72) Inventors: Armand Nachef, Le Bretonneux (FR); Gerard Sitbon, Le Bretonneux (FR)

(73) Assignee: BULL S.A.S., Les Clayes sous Bois (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/297,014

(22) Filed: Oct. 18, 2016

(65) Prior Publication Data

US 2017/0109138 A1    Apr. 20, 2017

Related U.S. Application Data

(60) Continuation of application No. 11/520,768, filed on Sep. 14, 2006, now Pat. No. 9,507,606, which is a division of application No. 09/582,757, filed as application No. PCT/FR99/02634 on Oct. 28, 1999, now Pat. No. 7,143,416.

(30) Foreign Application Priority Data

Oct. 30, 1998  (FR) .................................... 98 13641

(51) Int. Cl.
*G06F 9/44* (2006.01)

(52) U.S. Cl.
CPC ............ *G06F 8/315* (2013.01); *G06F 9/4428* (2013.01)

(58) Field of Classification Search
CPC .............................. G06F 9/4428; G06F 8/315
See application file for complete search history.

(56) References Cited

U.S. PATENT DOCUMENTS

| | | |
|---|---|---|
| 5,475,843 A | 12/1995 | Halviatti et al. |
| 5,481,718 A | 1/1996 | Tadamitsu et al. |
| 5,485,617 A | 1/1996 | Stutz et al. |
| 5,692,195 A | 11/1997 | Conner et al. |
| 5,732,263 A | 3/1998 | Havens et al. |
| 5,761,509 A | 6/1998 | Harrington et al. |
| 6,085,034 A | 7/2000 | Danforth |
| 6,266,708 B1 | 7/2001 | Austvold et al. |
| 6,275,979 B1 | 8/2001 | Graser et al. |
| 6,405,363 B1 | 6/2002 | Carlson et al. |
| 6,437,805 B1 | 8/2002 | Sojoodi et al. |

(Continued)

FOREIGN PATENT DOCUMENTS

| | | |
|---|---|---|
| EP | 0 508 633 A | 10/1992 |
| EP | 0 546-684 A | 6/1993 |

OTHER PUBLICATIONS

J.B. Wilson, "The C++ Softbench Class Edition"; Hewlett-Packard Journal, vol. 48, No. 1, Feb. 1, 1997, pp. 12-15, XP000722924.

(Continued)

*Primary Examiner* — S Sough
*Assistant Examiner* — Kimberly Jordan
(74) *Attorney, Agent, or Firm* — Miles & Stockbridge P.C.

(57) ABSTRACT

An object class (Class1) in a computer system is dynamically created by creating a global generic class (GenericClass) having two possible members, wherein at least one member is an instance of a generic class (GenericAttribute, GenericMethod), and by instantiating the global generic class.

16 Claims, 5 Drawing Sheets

(56) References Cited

U.S. PATENT DOCUMENTS 6,983,227 B1    1/2006    Thalhammer-Reyero

OTHER PUBLICATIONS

Richard A. Schummer; Subclassing Visual FoxPro Base Classes; Jan. 1996; 5 pages.
Chambers et al.; "Typechecking and Modules for Multi-Methods"; OOPSLA; 1994.
Marco Cantu; Comparing OOP Languages: Java, C++, Object Pascal; http://www.marcocantu.com/papers/ooplang.htm; retrieved May 19, 2012; Nov. 15, 1997; 16 pages.
Peter Müller, Introduction to Object-Oriented Programming Using C++, Aug. 31, 1997, retrieved Jul. 19, 2010 from http://www.zib.de/visual/people/mueller/Course/Tutorial/tutorial.html, 99 pages.
Davis Chapman, Sams Teach Yourself Visual C++ 6 in 21 Days; Aug. 14, 1998; 9 selected pages.

Name of the attribute [Text field]

Description of the attribute      Possible values of the attribute

[Text area]     [Text area]

Type of the attribute [Text field]     Default value of the attribute [Text field]

Real value of the attribute [Text field]

Name of the method [Text field]     Return type of the method [Text field]

Description of the method     Parameters of the method     [Add]

[Text area]    [Text area]    [Modify]

[Delete]

Name of the parameter [Text field]

Description of the parameter     Possible values of the parameter

[Text area]    [Text area]

Type of the parameter [Text field]     Default value of the parameter [Text field]

Real value of the parameter [Text field]

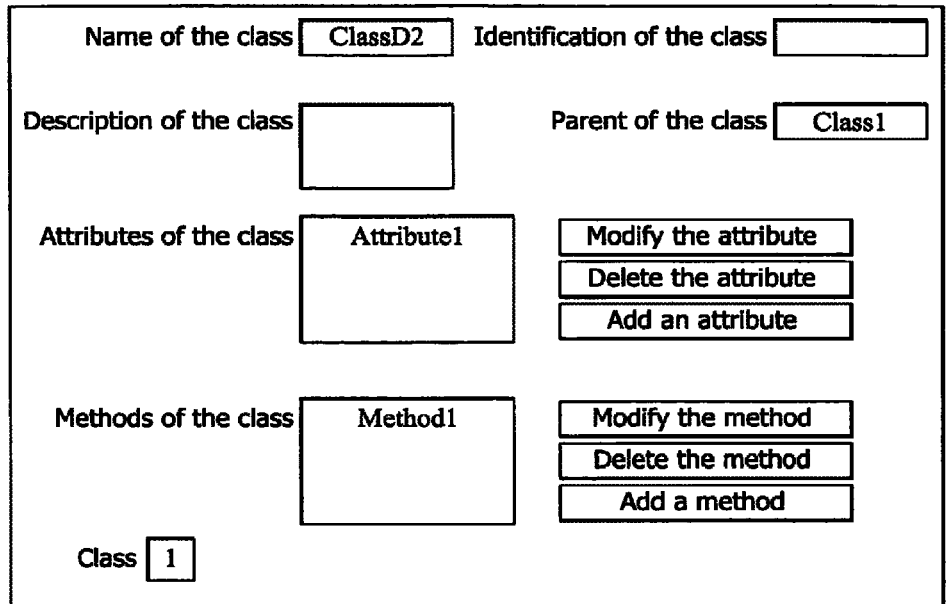
FIG. 10
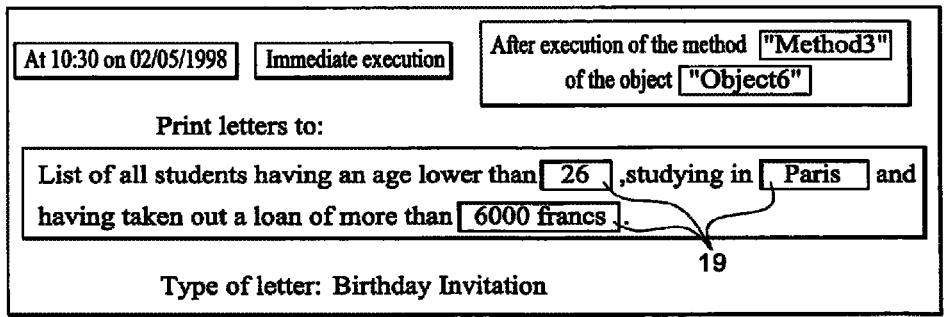
FIG. 11
FIG. 12

DYNAMIC CREATION OF OBJECT CLASSES

CROSS REFERENCE TO RELATED APPLICATIONS

This application is a continuation of application Ser. No. 11/520,768 filed Sep. 14, 2006, which is a division of application Ser. No. 09/582,757, filed on Jun. 30, 2000, now U.S. Pat. No. 7,143,416 issued Nov. 28, 2006, in the names of Armand NACHEF and Gerard SITBON, which is a 371 of PCT/FR99/02634 filed Oct. 28, 1999, which claims the priority benefit of French Application No. 98 13641 filed Oct. 30, 1998, and the subject matter of this application is related to corresponding French Application No. 98 13645 and PCT application No. PCT/FR99/02629; application Ser. No. 09/582,762, now abandoned, filed on Jun. 30, 2000, in the name of Jean-Marc GOUBE, Armand NACHEF and Gerard SITBON, entitled "METHOD FOR GENERATING INTERFACES FOR CONTROL BY A COMPUTER SYSTEM USER", and corresponding to French Application No. 98/13642 and PCT application No. PCT/FR99/02632; application Ser. No. 09/582,702, now abandoned, filed on Jun. 30, 2000, in the names of Armand NACHEF and Jean-Michel RAVON, entitled "METHOD FOR AUTOMATICALLY GENERATING IN AN OBJECT-ORIENTED LANGUAGE A DRIVER FOR IMPLEMENTING AN ABSTRACT METHOD OF AN ABSTRACT CLASS" and corresponding to French Application No. 98/13644 and PCT application No. PCT/FR99/02633, and application Ser. No. 09/582,701, filed on Jun. 30, 2000, in the names of Armand NACHEF and Gerard SITBON, entitled "DERIVING AN OBJECT CLASS BY INHERITANCE, INSTANTIATION OR CLONING" and corresponding to French Application No. 98/13643 and PCT application No. PCT/FR99/02630, the subject matter of each of said applications is hereby incorporated by reference.

FIELD OF THE INVENTION

The invention relates to a method for dynamically creating object classes in a computer system. It applies to any computer program using an object-oriented language like those currently known as C++ and Java®, and to any computer system. The invention also relates to the computer system that implements the method.

DESCRIPTION OF RELATED ART

In all the current object-oriented programs, the classes are declared statically. By contrast, the objects are often constructed dynamically with the "New" function common to all of these languages. Consequently, the dynamic creation of an object class is accomplished in several steps. The first step consists of creating a class by writing code. In Java language, this code can be, for example, in the following form:

```
classExampleOfClass
{    int i;   //integer type attribute
     String str; //character string type attribute
     void print(String st; int nb)
     {...call script that allows printing...}
     //method for printing the character string st,
     nb times.
}
```

The second step consists of inserting this code into the general program. In a third step, the code obtained is compiled. It is only in the fourth step that the objects can be dynamically created using the "New" instruction, which is included in all object-oriented languages.

The technique used today has two major drawbacks. First, the automatic generation of the code is an intrinsically laborious, extremely time-consuming process, requiring a good knowledge of software. For example, in order to modify an attribute in a class, it is necessary to search for the attribute in a program, read the program (which is difficult since it is not a structured database), retrieve the data related to the attribute, and modify the data using complex operations. Secondly, it is necessary to know how to insert this code in the right place in the existing program. Thirdly, with each creation or modification of a class, it is necessary to perform a recompilation, which is an operation that is very slow and entirely unacceptable for the person using the application in an interactive way.

SUMMARY OF THE INVENTION

One object of the invention is to be able to rapidly create classes dynamically.

A second object is to dynamically create classes in a simple and cost-efficient way.

The subject of the invention is a method for dynamically generating an object class in a computer system, characterized in that it consists of creating a global generic class having two possible members, whereof at least one member is an instance of a generic class, and of instantiating the global generic class in order to have said object class.

The corollary subjects of the invention are the resulting computer system, and a recording medium such as a magnetic diskette or CD-ROM, incorporating software for implementing the method.

BRIEF DESCRIPTION OF THE DRAWINGS

FIG. 4 is a dialog box used by the designer to define an attribute of the class presented in FIG. 3.

FIG. 5 is a dialog box used by the designer to define a method of the class presented in FIG. 3.

FIG. 6 is a dialog box used by the designer to define a parameter of a method defined in FIG. 5.

FIGS. 9 and 10 are dialog boxes used by the designer to define the class derived by using the method illustrated in FIG. 8.

FIGS. 11 and 12 illustrate two respective interfaces resulting from the implementation of the method of the invention.

DESCRIPTION OF THE PREFERRED EMBODIMENTS

Figures 1, 13:
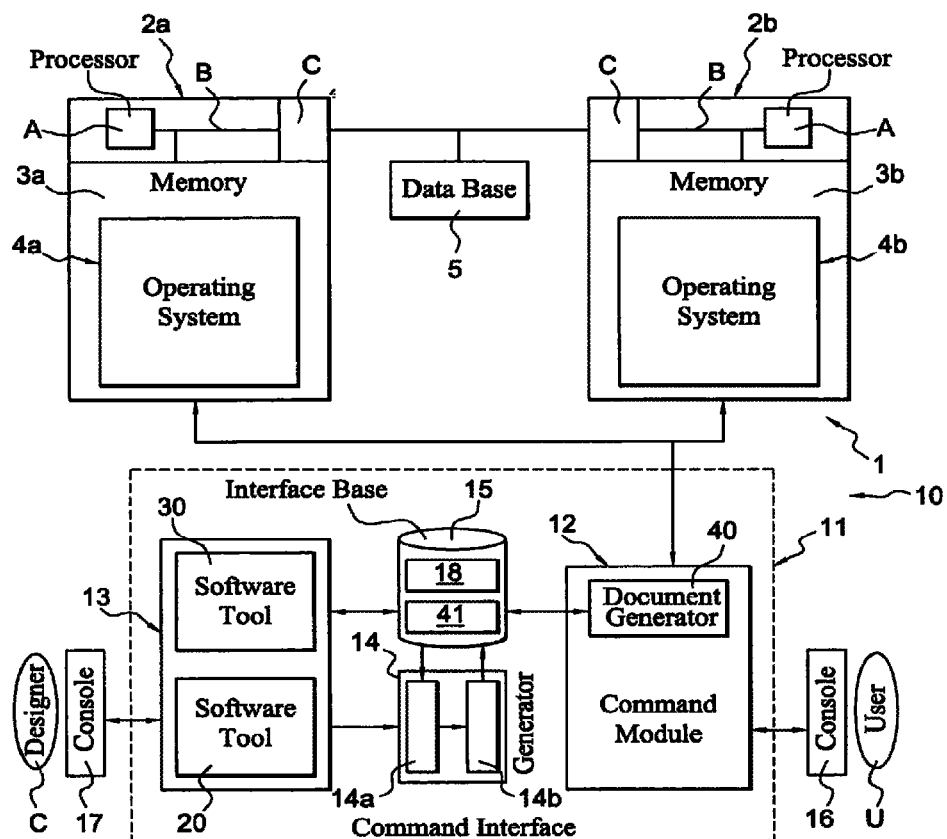
FIG. 1 is a block diagram of a computer system that implements the method of the invention for dynamically creating object classes.
FIG. 13 is a window presented to the user for the utilization of the interfaces illustrated in FIGS. 1, 11 and 12.

FIG. 1 illustrates a computer system 10 operated by a user U by means of a command interface 11. The system 10 can be any type of system. The system 10 illustrated includes a computer infrastructure 1 comprising at least one machine, two machines 2a and 2b in the example illustrated. Each machine illustrated has, in a way that is well known, at least one processor A connected through a bus B to a memory 3a and 3b. Generally, the memory can be local or distributed, or the machines can form nodes of a network within the infrastructure 1. Software means, including one or more operating systems 4, are stored in each memory 3a and 3b. In order to better highlight the advantages of the invention, the system will be considered to be a heterogeneous system, representing a case that is difficult to handle. The two machines 2 are assumed to run on two respective operating systems 4a and 4b of different types or versions, for example an operating system of the proprietary type and an operating system of the open type, for example one known by either of the registered trade names UNIX or Windows NT. The computer infrastructure 1 also has database means, called a database 5, which can be constituted by one or more local or remote databases. The machines 2 each also have an input/output interface C connected to the bus B. The input/output interfaces C of the two machines are connected to one another as well as to the database 5.

The command interface 11 comprises a command module 12, a design module 13, an interface generator 14 and an interface base 15. The module 12 is connected by a two-way connection to the computer infrastructure 1. The interface base 15 is connected by a two-way connection to the modules 12 and 13 and to the generator 14. The generator 14 is also connected that it can be controlled by the module 13. The command module 12 is used by the user U to control and use the data of the system 10. The design module 13 is used by a designer C, who is another user of the interface 11 but who is a computer specialist. The two users U and C have respective consoles 16 and 17 attached to the respective modules 12 and 13.

In short, the user U defines needs in order to understand and improve the running of the company and submits his needs to the designer C. The designer C creates, by means of his module 13, software objects that meet the needs of the user U and sends them to the generator 14 to be converted into interfaces 18 (FIGS. 11 and 12) that correspond to his needs and express the commands of the system in a language that is understandable to him. These interfaces are used by the user to create documents and are called document interfaces.

The user U is, for example, a bank branch manager who is not a computer specialist. It is assumed, for example, that the user U wants to consult the bank's computer infrastructure 1 to perform queries in order to obtain a list of the students that are clients of the branch, and print personalized information, invitation and reminder letters for them. The user U transmits his needs to the designer C, for example during a meeting between them. The designer transcribes these needs using the module 13, in a first step, to create, modify and/or delete objects and object classes related to these needs. For example, in order to meet the above-mentioned need of the user U, the designer C will create a class "print" with: a first attribute "distribution list" based on a set of criteria, in this case the students of the branch; a second attribute "number of copies" (integer); a first method "print" having as a parameter the destination printer; and a second method "display print jobs" in order to know the progress of the printing. The objects and classes created by the designer are stored in the interface base 15. The final transcription by the designer C of the needs of the user U is contained only in objects that have previously been directly created or that are instances of previously defined classes. These objects are contained in the base 15, which is contained in the command interface 11 in the example illustrated but which could be outside the interface 11 and included in the computer infrastructure 1. The objects are converted into document interfaces presented to the user U for him to use to create command documents that meet his needs.

The module 13 will be presented first. It uses two software tools 20 and 30, which respectively execute a process for dynamically creating classes and a process for deriving classes and objects. The tool 20 for dynamically creating classes will now be presented.

Figure 2:
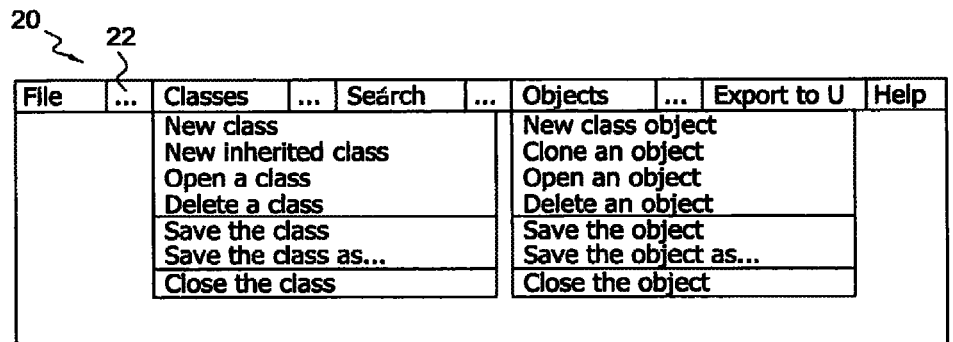
FIG. 2 is a window used by a designer to implement the method of the invention.

FIG. 2 illustrates an example of a screen 21 displayed on the console 17 that serves as an interface between the designer C and the module 13. The screen 21 has a menu bar 22, that includes in particular the menus "Classes," "Objects," "Search" and Export to U." The "Classes" menu makes it possible to dynamically create object classes, by inheritance or not. It also makes it possible to open a class, possibly in order to modify it, save it, or close it. The "Objects" menu makes it possible to instantiate the classes defined previously, in order to create objects, which can then be cloned. Just as for the classes, it is possible to open an object, modify it, save it on the disk and close it. With the tool 20, the designer C can define the commands that are found in both menus, as illustrated for example in those of the screen 21. The "Classes" menu illustrated contains the commands "New class," "New inherited class," "Open a class," "Delete a class," "Save the class," "Save the class as . . . " and "Close the class." The "Objects" menu contains the commands "New class object," "Clone an object," "Open an object," "Delete an object," "Save the object," "Save the object as . . . " and "Close the object."

The tool or software 20 implements a method for automatically generating an object class. The method is triggered automatically by the design module 13 when the designer C activates the command "New class" on the "Classes" menu in the window 22 of FIG. 2. The method for automatically generating a class consists of creating a global generic class "GenericClass" having two possible members, one of them being related to at least one attribute and the other being related to at least one method, at least one of the two members being an instance of a generic class, and of instantiating the global generic class in order to have said object class. In the tool 20 illustrated, two generic classes "GenericAttribute" and "GenericMethod" are assigned to the two respective members of the global generic class "GenericClass." Furthermore, if a method includes at least one parameter not fixed, this parameter is itself an instance of a corresponding generic class "GenericParameter."

Generally, the four generic classes thus created are not visible to the designer C. In the example illustrated, they are made available to the designer C when he executes a command in the "Classes" and "Objects" menus. Thus, a generic class is defined as a class that allows the designer C to create a new class by creating an instance of a global generic class. Since the creation of instances is dynamic in all languages, the creation of a class is also dynamic for the designer C. Likewise, given that an object is a new instance of a class, the creation of an object also corresponds to the creation of a copy of this class, i.e., to a new instance of a global generic class. Consequently, the process triggered by the tool 20 is also triggered when the designer C activates the command "New class object" in the "Objects" menu in the window 22 of FIG. 2. The method will now be illustrated in the way that it is presented to the designer C by the tool 20.

Figure 3:
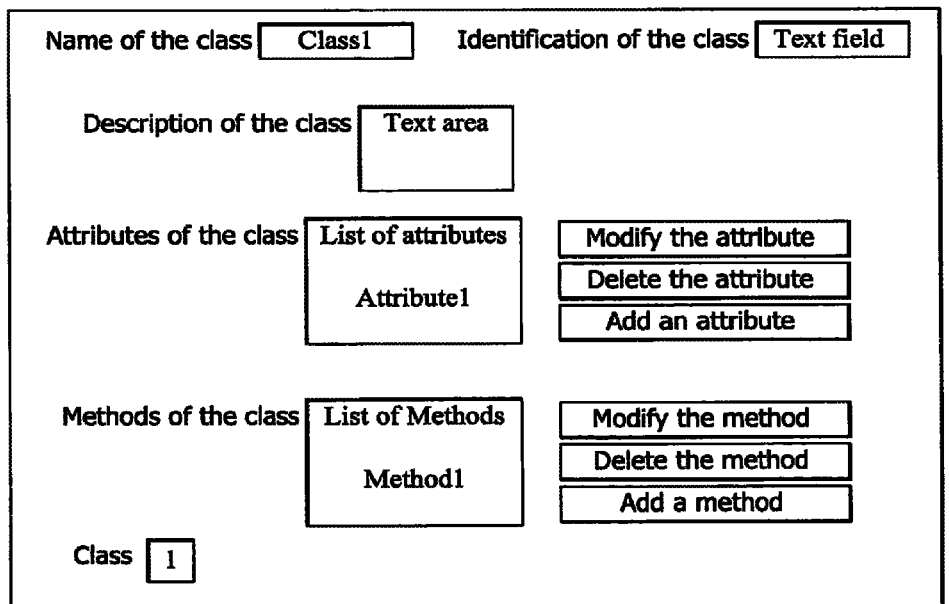
FIG. 3 is a dialog box used by the designer to dynamically create a class that suits the use of the system desired by the user.

FIG. 3 illustrates an example of a dialog box 23 that the tool 20 opens when the designer C clicks on the command "New class" in the "Classes" menu. The designer C uses the dialog box 23 to enter all of the data relative to a new class that does not inherit anything. It is understood that the data are the attributes and the methods of the new class.

The box 23 illustrated contains, for the entry of the data:
a text field "Name of the class"
a text field "Identification of the class (Class Id)"
a text area "Description of the class"
a list "Methods of the class" and
a list "Attributes of the class".

The box 23 also contains the six command buttons outlined in bold lines:
"Modify the method"
"Delete the method"
"Add a method"
"Modify the attribute"
"Delete the attribute" and
"Add an attribute".

When this dialog box is validated, it results in the creation of an instance of a global generic class called "GenericClass." The global generic class of the example illustrated in FIG. 3 has several attributes.

The first attribute is a name, formed by a character string designating the name of the class. It is written by filling in the field "Name of the class" in the box 23.

The second attribute is an identification of the class, formed by a character string that makes it possible to uniquely identify the class or the object in the system. This attribute is written by filling in the field "Identification of the class" in the box 23, for example indicating the date and time of creation, a random number forming a ticket, etc.

The third attribute is a description, formed by the text that describes the purpose of the class. It is written by filling in the area "Description of the class."

The fourth attribute is a table named "Attributes," which references the attributes of the class. The attributes of the class are themselves instances of a generic attribute class called "Generic Attribute," which has as attributes:
the name of the attribute
the description of the attribute
either the type of the attribute or the possible values of the attribute
the default value of the attribute, given at the creation of the class "GenericAttribute" and
the real value of the attribute, which is invisible to the designer C and is therefore not defined during the creation of the class. It is defined by the user U as described below.

For example, the class "Attributes[i]" is an instance of "Generic Attribute" and references the $i^{th}$ attribute of the class defined by the designer C.

FIG. 4 illustrates a dialog box 24 of the tool 20 constituting the fourth attribute of "GenericClass." This box is opened from the box 23, for example by giving the name "Class1" to the class derived through the instantiation of the global generic class "GenericClass" and by activating the button "Add an attribute." The box 24 contains:
a text field "Name of the attribute"
a text area "Description of the attribute"
a text field "Type of the attribute"
a text area for "Possible values of the attribute"
a text field "Default value of the attribute" and
a text field "Real value of the attribute," shown in gray in FIG. 4 to indicate that it is not visible to the designer C.

Likewise, to modify an attribute, one need only select the attribute from the list of attributes in FIG. 3 and activate the button "Modify the attribute," in order to bring up the dialog box 24 of FIG. 4 and modify the data that appears in the box 24.

As the first attribute, the attribute is given the name "Attribute1" and the other fields are filled in. The validation of the dialog box 24 results in the creation of an instance of the generic class "GenericAttribute." The name "Attribute1" will appear in the list of attributes in FIG. 3, as indicated.

The fifth attribute of the generic class "GenericClass" is a table named "Methods," which references the methods of the class. These methods, in the example illustrated, are also instances of a generic method class called "GenericMethod." A method is defined by the following attributes:
its name
its description
its return type
its parameter, and
its execution script.

FIG. 5 illustrates a dialog box 25 of the tool or software 20 constituting the fifth attribute of "GenericClass." This box is opened from the box 23, for example by activating the button "Add a method." The box 25 contains:
a text field "Name of the method"
a text area "Description of the method"
a text field "Return type of the method"
a list of "Parameters of the method"
a command button "Add"
a command button "Modify," and
a command button "Delete."

As the first method, the method is given a name, for example "Method1," and the other fields are filled in. The validation of the dialog box 25 results in the creation of an instance of the generic class "GenericMethod." The name "Method1" will appear in the list of methods in FIG. 3, as indicated.

The generic class "GenericMethod" contains, in addition to the attributes of the method, a "Parameters" table that references the parameters of the method. The table may be empty if the generic class does not contain any parameter to be determined, or may not exist if this generic class is not intended to have any determinable parameter or if it has only fixed or predetermined parameters. In the table, the parameters are also instances of a generic class "GenericParameter." A parameter of a method is defined by the following attributes:
its name
its description
either its type or its possible values
its default value, and
its real value, not visible to the designer C.

For example, if the parameter relates to the number of pages to be printed, the default value will be 1, but the user U could indicate another real value, for example 3 in order to have three copies of the pages to be printed.

FIG. 6 illustrates a dialog box 26 of the tool 20 for filling in the parameter table of "GenericMethod" in FIG. 5. The box 26 is opened from the box 25 by activating the button "Add." The box 26 contains:

a text field "Name of the parameter"
a text area "Description of the parameter"
a text field "Type of the parameter"
a text area "Possible values of the parameter"
a text field "Default value of the parameter," and
a text field "Real value of the parameter," represented in gray in FIG. 5 to indicate that this field is not visible to the designer C.

As a first parameter, it is given for example the name "Param1" and the other fields are filled in. The validation of the dialog box 26 results in the creation of an instance of the generic class "GenericParameter." The name "Param1" will appear in the list of parameters in FIG. 5.

The dialog box 23 of FIG. 3 being filled, the class "Class1" is created dynamically. It can be validated by being saved with the command "Save the class" or "Save the class as . . . ".

Figure 7:
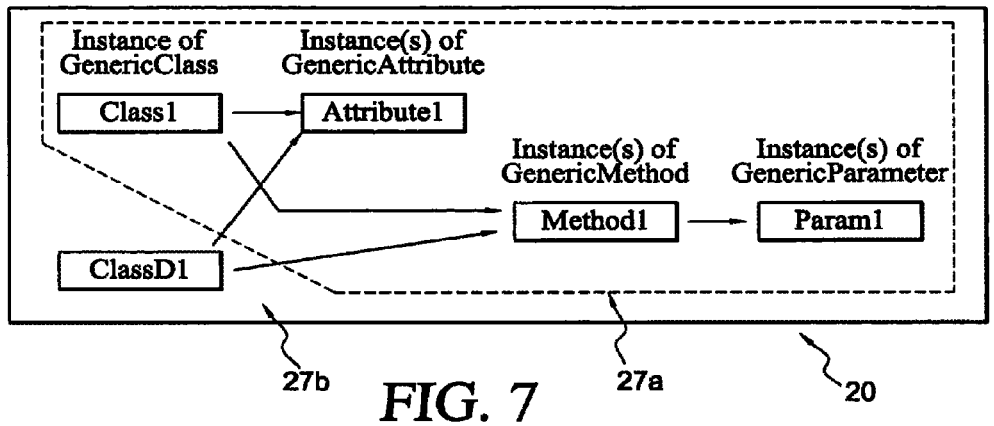
FIG. 7 is a block diagram of the tree structure of the class as defined by means of the dialog boxes presented in FIGS. 3 through 6.

FIG. 7 illustrates the tree structure 27a of the class "Class1" resulting from the validation of the box 23. In FIG. 7, the class "Class1" is an instance of the global generic class "GenericClass" and has an attribute "Attribute1" and a method "Method1," itself having a parameter "Param1," all three of which are instances of three respective generic classes. Of course, another class that is an instance of the global generic class "GenericClass" could have several instances of each of the three generic classes "GenericAttribute," "GenericMethod" and "GenericParameter." This tree makes it possible to dynamically modify, add and delete members of the class (attributes or methods) at any time.

It is known that an object is an instance of a class. The activation of the command "New class object" in the "Objects" menu in the window 21 of FIG. 2 displays on the console 17 of the designer C a dialog box (not illustrated) that contains the list of all the classes already defined. The designer C can select one of these, which will be the class of the new object. Within an object, values can be given to the attributes. These values will represent its identity and its state.

Furthermore, the global generic class "GenericClass" as it appears in FIG. 3 preferably has an additional attribute consisting in a boolean 0" or "1," which indicates whether the instance of the current generic class represents a class or an object. In the example illustrated, the boolean is "1" to indicate that the designer is creating a class. The boolean is automatically set to the corresponding value in response to the command "New class" or "New class object" that has been activated by the designer C in the window 22 of FIG. 2. In the example chosen, this attribute is not visible to the designer C and is therefore shown in gray.

Also, in the window 21 of FIG. 2, the "Search" menu is very useful to the designer C for performing a powerful search in the base 15 to find classes and objects created in accordance with a list of criteria that he defines. The designer C can, for example, create a new class through inheritance from a class he has found, instead of starting from zero and redoing a job that has already been done.

More generally, the dialog boxes 23-26 are used by the designer, respectively, to generate the global generic class and the generic classes that can compose it. Although the dialog boxes illustrated completely define these classes, not all of the attributes, types, text fields and areas illustrated are necessary. In particular, the descriptions are illustrated for purposes other than the method for automatically generating classes that has just been described.

The description will now refer to the tool or software 30 for deriving a class or an object, the tool 30 being contained in the module 13 of the command interface 11 of FIG. 1.

Inheritance with the command "New inherited class," instantiation with the command "New class object" and cloning with the command "Clone an object" all require the dynamic creation of a copy of the class (for inheritance or instantiation) or a copy of the object (for cloning).

FIG. 7 also illustrates a tree 27b of a class "ClassD1" obtained by duplicating "Class1." This figure illustrates, in a general way, that the duplication of the instance of "GenericClass" is not enough, since the duplicated class "ClassD1" will point to the same instances "GenericMethod" and "GenericAttribute" as the instance "Class1" of "GenericClass." For example, it is clear from FIG. 7 that "Attribute1" is common to both classes, while the two classes must be distinct and independent. Consequently, in order to derive a class or an object, i.e., in order to create a new class through inheritance, instantiate a class or clone an object, it is necessary not only to duplicate the instance of "GenericClass," but also to duplicate each instance directly or indirectly referenced by the instance of "GenericClass."

Furthermore, software developers use a serialization technique that is applied to many languages, such as Java or C++. Serialization makes it possible to store any object on a data recording medium, a disk for example. If for example a first object references objects, which themselves reference other objects and so on, one need only write the first object onto the disk with the serialization method in order to automatically store in memory the tree of all the objects directly or indirectly referenced by the first object.

Figure 8:
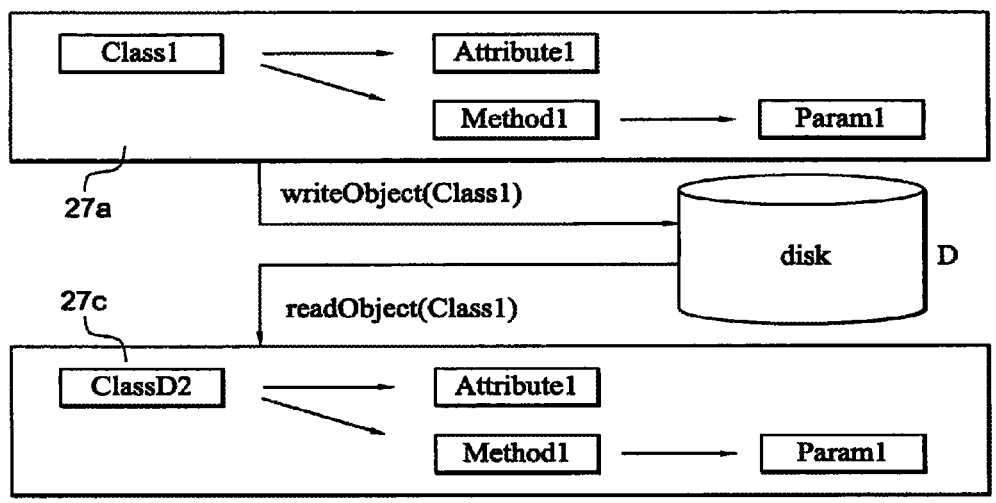
FIG. 8 is a block diagram illustrating a method for the derivation of the class presented in FIG. 7.

FIG. 8 schematically illustrates the principle of the method for deriving a class "Class1" or an object. The tool 30 implements this method. The example illustrated refers to the creation of a class "ClassD2" by inheritance from the class "Class1" as illustrated in FIG. 7, it being understood that the method can be applied in the same way to the instantiation of a class or the cloning of an object. As indicated in FIG. 8, the derivation method consists, in a first step, of serializing the class "Class1" by copying it onto a disk D, for example the hard disk of a machine 2a or 2b of the computer infrastructure 1 of FIG. 1. Thus, the entire tree 27a of this class, as illustrated in FIG. 7, will be duplicated and stored on the disk. The second step consists of reading the duplicated class stored in the disk D, by loading it into the tool 30, i.e., into the RAM in which the program of the tool is loaded. Thus, the duplicated class "ClassD2" has a tree 27c identical to that of the tree 27a of the mother class "Class1" but is independent of the mother class. In Java language for example, the two steps of the method can be executed for example by the following two instructions:

```
FileStream.writeObject(Class1);
// for serializing the source tree Class1;
New object or New class = FileStream.readObject( );
// to have a copy of Class1
```

Figure 9:
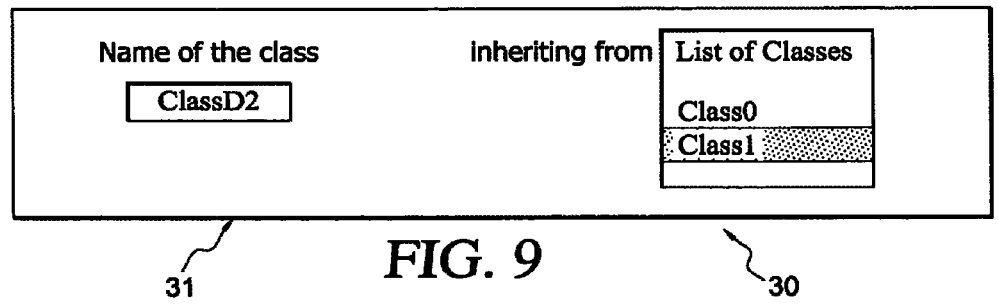

FIG. 9 illustrates a dialog box 31 for the utilization of the tool 30. This example is similar to that of FIG. 8, which relates to the creation of a class inheriting from another class. Upon execution of the command "New inherited class" from the "Classes" menu of FIG. 3, the dialog box 31 of FIG. 9 appears. This box contains a text area "Name of the new class" and a list of the classes from which the mother class can be chosen. In the example chosen, the class "Class1" is chosen from the list, as indicated in gray in FIG. 9. In the preceding example, the inherited class is named "classD2."

FIG. 10 illustrates an example of a dialog box 32 resulting from the validation of the box 31. The box 32 is similar to the box 23 of FIG. 3. Consequently, only the differences will be indicated below. The data contained in the box 32 is automatically filled in by the software of the tool 30. The name of the class is the one indicated by the designer C in the box 31 of FIG. 9. The box 32 also contains a table indicating the parent or parents of the class, in this case "Class1," which the designer C has selected from the list in the box 31. The other data is similar to that of the box 23, since the tree 27c of the daughter class "ClassD2" is the same as the tree 27a of the mother class "Class1." Using the command buttons in the box 32, it is possible to have only the new class "ClassD2" evolve, independently from the mother class "Class1." The global generic class "GenericClass" therefore has an additional attribute named "parent," which is a table containing instances of the global generic class, such as Class1. The table makes it possible to know the provenance of the current instance, in the following way:
(a) If the current instance is an object, then:
   if in general "parent[0]" (indicated for example in the table to which the current instance refers) is an object, the current object has been cloned from parent[0],
   if "parent[0]" is a class, the current object is an instance of parent[0],
(b) If the current instance is a class, then "parent[0]" is either empty, which means that the class has been created without inheritance with the command "New class,"
   or a class (and not an object), which means that the current class has inherited from "parent[0]" through the command "New inherited class."
(c) With the result, by iteration, that the table "parent" indicates all the ascendants of the current instance.

The method is clearly shown in FIGS. 8, 9 and 10. In response to the first instruction indicated in FIG. 8, "Class1" is serialized by being copied onto the disk D. In response to the second instruction, the class thus serialized is again saved in memory, but with modifications of attributes, specifically the class name "ClassD2" and the table "Parent." The two trees 27a and 27c are therefore the same, but they are separate from one another. For example, even though they have the same two instances "Attribute1," in reality these two instances are completely separate from one another in memory and can exist independently from one another. In particular, they can be modified differently from one another at any time. This example also makes it clear that the same is true for the other two commands "New class object" and "Clone an object."

More generally, it is clear from the preceding description that the method for deriving an object class and/or an object having a given name consists of making a copy of the entire tree of the class or the object, saving the copy of the tree and changing said name in order to assign a name to the saved copy. We have seen that the copy is preferably made through a serialization of the tree representing said class or said object by copying the tree into a memory D, and the saving of the copy of the tree consists of copying it again into a memory 30. Furthermore, we have also seen that the serialization, which can be done in various languages, is particularly simple to implement in Java® language.

The function of the interface generator 14 will now be described. Up to this point, we have seen how the designer C can easily create object classes and objects that meet the needs of the user U. The classes and objects thus created are stored in the interface base 15. However, these classes and objects are still incomprehensible and unusable for the user U. Preferably, the user U is also prevented from accessing them, so that the designer can be assured of their integrity. The function of the generator 14 is to transform the classes and objects thus created into interfaces in the form of documents in which the commands that meet the needs expressed by the user U are understandable to him. In order to distinguish these interfaces from the other interfaces involved in this description, they will be called document interfaces. The language used in these document interfaces can be the current language and/or a specialized language in the user's field of expertise.

The operation of the generator 14 will be explained in the following example, which refers to and elaborates on the preceding example in which the company is a bank branch, the user U is the manager of the branch and the designer C is a computer expert of the bank. It is assumed that the manager U wants to (1) consult the bank's computer infrastructure to query the databases in order to obtain a list of his clients of a given type, students in the example in question, and (2) to print personalized letters of several types, such as information letters, invitation letters, and reminder letters. The computer expert C translates the operation desired by the manager into two questions. In this case, the computer expert creates in response two object classes, "consult_system" and "print," using the two tools 20 and 30. He can create each of these two classes directly by activating the command "New class" in the window 22 of FIG. 2, or indirectly through derivation from a similar class. In the latter case, the designer C can activate the "Search" command in the window 22 to find a similar class. If a similar class exists, he selects it from the list of classes and can derive it, for example by activating the command "New inherited class" of FIG. 2 and by modifying, adding or deleting attributes and/or methods.

The generator 14 implements a process for generating a document interface for the control of a computer system by a user, the command being created from at least one object that includes descriptions. The process consists of extracting at least some of said descriptions from the object and of organizing them so as to translate the meaning of said command into a language understandable to the user and thus create from said interface a document interface. The generator 14 therefore comprises an extraction block 14a and a generation block 14b. The extraction block 14a takes the object selected by the designer from the interface base 15 and extracts the descriptions from it. The generation block 14b organizes the descriptions to create the document interface and stores it in the interface base 15.

The method will be better understood from the preceding example. Among the attributes of the class "consult_system" of the example in question are methods that use specific commands to operate on the data of the system, in this case in the databases of the system 10. From these methods, the designer C creates a method "list_students" in order to have the description "List of all students having . . . ". The engineer assigns to the method "list_students" a return code of the "list" type having the description "list of the names and addresses." He also assigns to this method, using the dialog boxes 25 and 26 illustrated in FIGS. 5 and 6, the three parameters defined in Table A below.

TABLE A

| name | Description | type | default value |
| --- | --- | --- | --- |
| "age<" | "an age less than" | Integer | 26 |
| "place of study" | ", studying in" | Paris, Versailles | Paris |
| "loan>" | "and having taken out a loan of more than" | Integer | 6,000 francs |

For the class "print," the engineer C creates a method "print_invitation" in order to have a description such as "Print letters to:" and assigns this method a return code of the "void" type, indicating that the method does not return a value, and two parameters as defined in Table B below.

TABLE B

| name | description | Type | default value |
| --- | --- | --- | --- |
| "addressee" | "Print letters to" | List | list_students of consult_system information |
| "type of letter" | "type of letter:" | birthday invitation; reminder; information on the student loan | |

These tables indicate how to fill in the dialog boxes 25 and 26 of FIGS. 5 and 6 so as to constitute the two classes "consult_system" and "print" using the dialog box 23 of FIG. 3. More generally the document interface of an object is created from descriptions corresponding to this object, its attributes, its methods and the parameters of the methods.

To create a document interface, the designer activates the menu "Export to U" in the window 22 of FIG. 2. This command calls the generator 14 for generating a document interface from the selected object. The generator 14 extracts the descriptions of the object and organizes them to create the document interface.

FIG. 11 illustrates the document interface 18a of the method "list_students." It shows that the document interface 18a has been obtained by extracting descriptions from the method and its parameters, as defined in Table A. In particular, the values "26," "Paris," and "6,000 francs" are the default values indicated in Table A. Generally, a document interface 18 comprises text and at least one possible field 19 whose initial content is made of default values and can be modified by the user U.

FIG. 12 illustrates an example of a document interface 18b of the method "print_invitation" of the class "print" defined previously. The examples of FIGS. 11 and 12 are enough to allow one skilled in the art to know how to construct a document interface related to an entire object. Generally, when the object contains all the descriptions, they are preferably organized by the generator 14 in the following order:

1. the description of the object (not illustrated), for example "print";
2. the description of each attribute (not illustrated), for example the number of the printer, the print quality, the color of the ink, the printing paper, this description is followed by a field that corresponds to its value; if the attribute has a limited number of values, this field is a list containing all the possible values and allowing only the selected value to appear;
3. the description of each method (see Tables A and B, FIGS. 11 and 12 and the text related to them), this description being attached to and preferably followed by:
    3.1 the description of its return value, attached to or followed by a field that represents this value, and
    3.2 the description of each of its parameters, attached to or followed by a field (19) representing the value of the parameter,
4. a control means (see FIG. 12) indicating when the method should be executed, which execution can be immediate or deferred, or can occur at a moment determined by a date and a time, or as a result of another defined method.
    4.1 In the first case, a command button is labelled "Immediate execution"
    4.2 In the second case, a command button includes a label with a value "at" (for example—print "at"—) followed by a "time" field and a "date" field linked to a calendar of openable days of the year;
    4.3 In the third case, a command button includes a label entitled "after the end of execution of" followed by a field that makes it possible to choose a method of any object and that means the method will be executed after the end of the execution of the selected method.

The designer C has the capability to change the presentation of the page, add or remove fields, select the descriptions to be included, and modify the texts of descriptions and types to make the document easier to understand. It follows that the same object can generate several document interfaces adapted to specific needs offered in the object. For example, we have seen above that the object "print" can have a large number of attributes and methods, offering a wide choice of document interfaces as a function of the attributes and methods adapted to needs. It is of course recommended that the designer C create the document interfaces 18 with the help of the user U.

The description will now refer to the command module 12 used by the user U to obtain the document interfaces 18 from the base 15. The module 12 contains a block 40 for generating documents 41 created from document interfaces stored in the base 15. The block 40 is therefore connected to the base 15 in order to take the document interfaces 18 from it and determine which command documents 41 are adapted to the particular needs of the user U. For example, assuming that the user needs the document "print," an interface that includes the method illustrated in FIG. 12 will be presented to the user, who can modify the values of the fields 19 and select the execution command buttons to create a document 41. The document 41 illustrated in FIG. 12 corresponds to the document interface 18, in which the values of the fields 19 have remained unchanged by the user and the execution button has been deferred to a predetermined time has been activated (in gray in FIG. 12).

FIG. 13 illustrates an example of a dialog box 42 presented to the user U by the user module 12. The menu bar of the box 42 contains, in particular, two main menus, "Documents" and "Preferences." In the "Documents" menu, there is the "Search" command for finding document interfaces, for example from descriptions of the corresponding objects, and the "Open" command for listing document interfaces by the names of their corresponding objects and selecting an object name from them. A selected object is displayed with the description of the object. From this interface, the user creates the desired document. In the "Documents" menu, there are also of course the commands for saving (Save and Save as . . . ) and for closing the document.

The "Preferences" menu contains, in particular, two commands, "Display" and "Display history." The "Display"

command displays all of the documents created by the user in the order of execution of the commands he has chosen. This set defines the user's preference. He also has a global view of the methods he has activated from several documents. He can validate it or modify it. For example, clicking twice on a chosen method causes the opening of the corresponding document for possible modifications. The command "Display history" presents all the methods that have been executed by the user, the end of execution status, and the time. The menu also contains the save and close commands.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. A method for dynamically generating a run time class object in a computer system, comprising:
    creating a global generic class having a first member being related to at least one attribute and a second member being related to at least one method, wherein at least one of the first and second members is an instance of a generic class, the generic class having at least a name as an attribute, wherein the name is a user-defined run-time class object definition;
    deriving said run time class object from said global generic class based on a user-defined run time class definition provided at run time; and
    generating, at run time, the user-defined run time class object definition from said global generic class by directly instantiating an instance of the global generic class without inheriting from the global generic class and associating the instance of the generic class with the instance of the global generic class based on the user-defined run time class definition provided at run time.

2. The method according to claim 1, wherein the first member is an attribute of the global generic class, said first member being an instance of a generic attribute class.

3. The method according to claim 1, wherein the second member is a method of the global generic class, said second member being an instance of a generic method class.

4. The method according to claim 2, wherein the second member is a method of the global generic class, said second member being an instance of a generic method class.

5. The method according to claim 1, further comprising automatically generating the global generic class and the generic class by means of a tool having respective dialog boxes for defining attributes of these classes, including the name attribute of the generic class.

6. The method according to claim 1, wherein the method is implemented ii-sin a command interface of the computer system.

7. The method according to claim 1, wherein the global generic class and the generic class is created by a designer who is a computer expert, and a user who may not be a computer expert uses the command interface to instantiate the global generic class created by the designer to generate said run time class.

8. The method according to claim 2, further comprising automatically generating the global generic class and the generic class by means of a tool having respective dialog boxes for defining attributes of these classes, including the name attribute of the generic class.

9. The method according to claim 3, further comprising automatically generating the global generic class and the generic class by means of a tool having respective dialog boxes for defining attributes of these classes, including the name attribute of the method class.

10. The method according to claim 4, further comprising automatically generating the global generic class and the generic class by means of a tool having respective dialog boxes for defining attributes of these classes, including the name attribute of the generic attribute class and the name attribute of the generic method class.

11. The method according to claim 2, wherein the method is implemented using a command interface of the computer system.

12. The method according to claim 3, wherein the method is implemented using a command interface of the computer system.

13. The method according to claim 4, wherein the method is implemented using a command interface of the computer system.

14. The method according to claim 5, wherein the method is implemented using a command interface of the computer system.

15. A computer system for implementing a method for dynamically generating a run time class object comprising:
    means for creating a global generic class having a first member being related to at least one attribute and a second member being related to at least one method, wherein at least one of the first and second members is an instance of a generic class, the generic class having at least a name as an attribute;
    means for deriving said run time class object from said global generic class based on a user-defined run time class definition provided at run time; and
    a command interface, constructed to implement the method for dynamically generating the run time class object in the computer system is implemented,
    wherein the command interface is configured to create the global generic class having the first member being related to the at least one attribute and the second member being related to the at least one method, wherein the at least one of the first and second members is an instance of the generic class, the generic class having at least the name as an attribute, and
    derive said run time class object from said global generic class based on a user-defined run time class definition provided at run time.

16. The computer system according to claim 15, wherein the command interface includes a design module configured such that a designer who is a computer expert creates the global generic class and the generic class and a command interface within which a user who may not be a computer expert generates the object class from the global generic class created by the designer in the design module.

* * * * *